(12) United States Patent
Bibikar et al.

(10) Patent No.: US 7,334,158 B2
(45) Date of Patent: Feb. 19, 2008

(54) POWER FAULT HANDLING METHOD, APPARATUS, AND SYSTEM

(75) Inventors: Vasudev J. Bibikar, Austin, TX (US); Mark N. Fullerton, Austin, TX (US)

(73) Assignee: Intel Corporation, Santa Clara, CA (US)

( * ) Notice: Subject to any disclaimer, the term of this patent is extended or adjusted under 35 U.S.C. 154(b) by 585 days.

(21) Appl. No.: 10/879,515

(22) Filed: Jun. 29, 2004

(65) Prior Publication Data
US 2005/0289393 A1  Dec. 29, 2005

(51) Int. Cl.
*G06F 11/00* (2006.01)
(52) U.S. Cl. ...................................................... 714/14
(58) Field of Classification Search ............... 714/14, 714/22, 36; 713/330, 340, 320–324
See application file for complete search history.

(56) References Cited

U.S. PATENT DOCUMENTS

| | | | | |
|---|---|---|---|---|
| 5,230,055 A | * | 7/1993 | Katz et al. | 713/300 |
| 5,230,074 A | * | 7/1993 | Canova et al. | 714/14 |
| 5,345,392 A | * | 9/1994 | Mito et al. | 713/300 |
| 5,878,264 A | * | 3/1999 | Ebrahim | 713/323 |
| 6,266,776 B1 | * | 7/2001 | Sakai | 713/300 |
| 6,360,327 B1 | * | 3/2002 | Hobson | 713/300 |
| 6,571,343 B1 | * | 5/2003 | Johnson et al. | 713/340 |

* cited by examiner

*Primary Examiner*—Scott Baderman
*Assistant Examiner*—Kevin D Scarbery
(74) *Attorney, Agent, or Firm*—Dana B. Lemoine; Lemoine Patent Services, PLLC

(57) ABSTRACT

A processor may receive multiple signals corresponding to potential power faults. A control register in the processor may specify actions to be taken for each of the potential power faults.

11 Claims, 6 Drawing Sheets

POWER FAULT HANDLING METHOD, APPARATUS, AND SYSTEM

FIELD

The present invention relates generally to electronic systems, and more specifically to power fault handling in electronic systems.

BACKGROUND

Processors typically receive power to operate when included in a system. The power may be received directly from one or more batteries, or from a power management integrated circuit or system, or the like. A "power fault" may be generated as a result of any power-related occurrence that needs attention. For example, a processor may receive a power fault signal from a power management integrated circuit when a battery is low.

DESCRIPTION OF EMBODIMENTS

Figure 1:
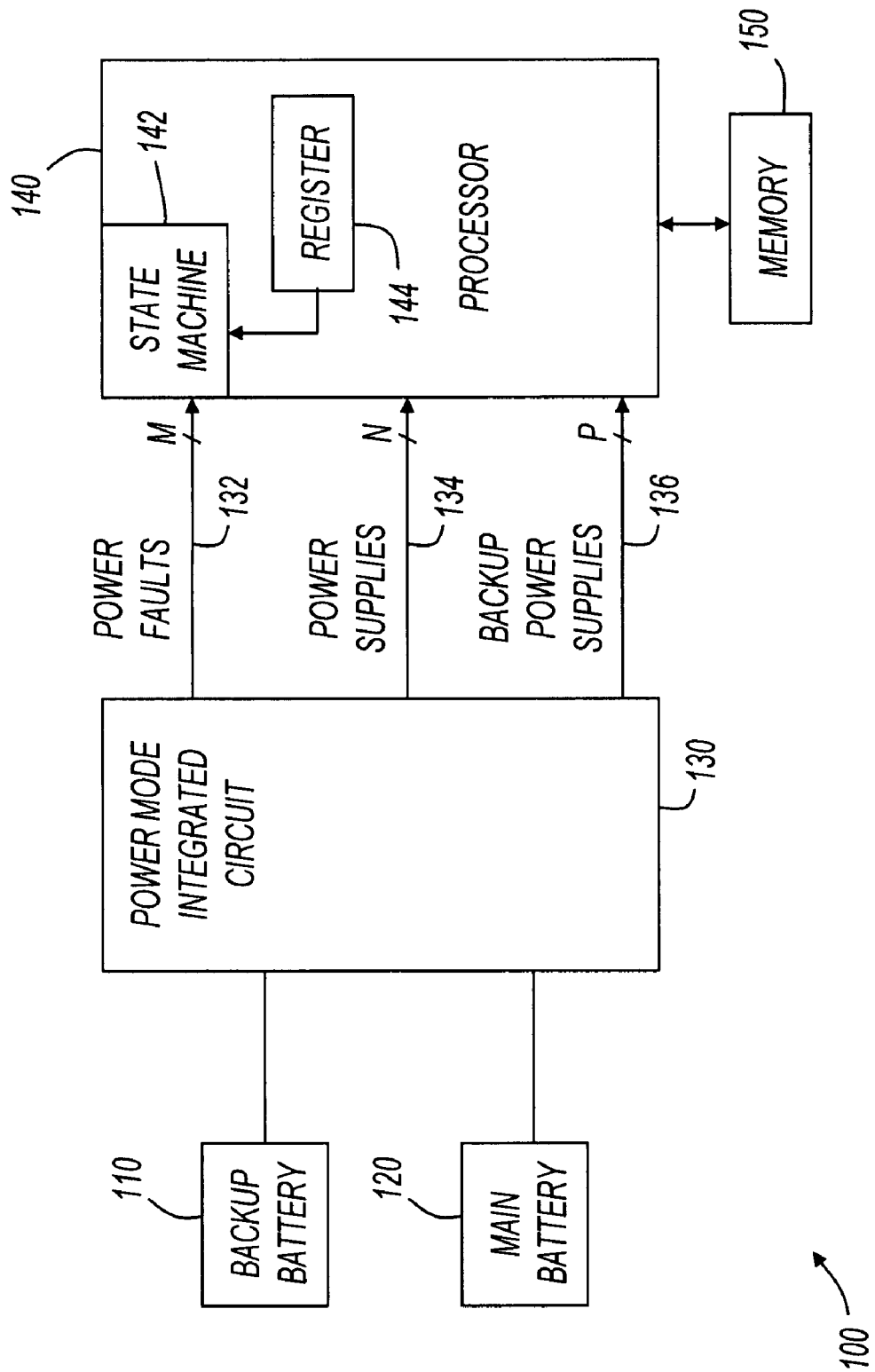
FIG. 1 shows an electronic system including a processor.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the spirit and scope of the invention. In addition, it is to be understood that the location or arrangement of individual elements within each disclosed embodiment may be modified without departing from the spirit and scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

FIG. 1 shows an electronic system including a processor. Electronic system 100 includes back-up battery 110, main battery 120, power mode integrated circuit (PMIC) 130, processor 140, and memory 150. Processor 140 may be any type of processor. For example, in some embodiments, processor 140 may be a microprocessor, a digital signal processor, an embedded micro-controller, or the like. In some embodiments, power PMIC 130 is coupled to processor 140 by multiple signal paths and other conductors. For example, as shown in FIG. 1, PMIC 130 provides processor 140 with power supply voltages on power supplies 134 and back-up power supplies 136, and indications of power faults on conductors 132.

In operation, PMIC 130 provides power to processor 140 using power supplies 134 and back-up power supplies 136. In some embodiments, each of power supplies 134 and 136 includes two conductors: one for a power supply voltage, and one for a reference voltage, such as ground. In other embodiments, each of power supplies 134 and 136 includes a single conductor to provide a power supply voltage, and a separate conductor is provided in common for all of power supplies 134 and 136.

As shown in FIG. 1, power supplies 134 includes N separate supplies, and back-up power supplies 136 includes P separate power supplies. In the various embodiments of the present invention, any number of power supplies 134 and back-up power supplies 136 may be provided to processor 140 by PMIC 130. For example, power supplies 134 may include separate power supply lines to power various portions of processor 140. Power supplies 134 may include a separate power supply to power a processor core within processor 140, an internal memory within processor 140, and other functional blocks within processor 140. Each of power supplies 134 may be at a separate voltage, or each of power supplies 134 may be at a common voltage. In some embodiments, different voltages are provided on power supplies 134 based on power requirements of processor 140. Back-up power supplies 136 may include one or more power supply voltages to provide back-up power to processor 140.

Power mode integrated circuit 130 also provides power fault indications to processor 140 on power faults 132. Power mode integrated circuit 130 may provide a power fault indication based on any state of the power system that may require action on the part of processor 140. For example, if one or more of back-up battery 110 or main battery 120 are low on power, PMIC 130 may provide a power fault indication to processor 140 on power faults 132. Also for example, PMIC 130 may provide a power fault indication when one or more of the batteries is draining too fast. Further, PMIC 130 may provide a power fault indication when any potentially hazardous condition arises within the power system.

System 100 is shown with two batteries: back-up battery 110, and main battery 120. In the various embodiments of the present invention, any number of batteries may be utilized. For example, in some embodiments, a single battery is utilized for both main power and back-up power. Also for example, in some embodiments, many batteries are used, and in still further embodiments, a battery charger with components such as a transformer and rectifier may also be used.

Processor 140 includes state machine 142 and register 144. State machine 142 is coupled within processor 140 to receive power fault indications on power faults 132. When a power fault indication is received, state machine 142 may respond in many different ways. For example, if a power fault signifies a problem with one or more of power supplies 134, state machine 142 may cause processor 140 to enter a reduced power state, and to stop utilizing one or more of power supplies 134 for power. Further, state machine 142 may utilize information in register 144 when determining what actions to take when a power fault indication is received. In some embodiments, register 144 includes one or more control bits for each of the possible power fault indications that can be received on power faults 132. In some of these embodiments, state machine 142 may take a different action based on the identity of the power fault indication, as well as the one or more control bits in register 144 that correspond to the received power fault indication. For example, in response to receiving a power fault indication, state machine 142 may cause processor 140 to take a particular action such as causing processor 140 to enter a reduced power state without allowing software intervention. In some embodiments, this corresponds to state machine 142 performing a hardware controlled change of state, without allowing software running on processor 140 to intervene, and without allowing processor 140 to otherwise save state information describing the current state of processor 140. In other embodiments, state machine 142 may initiate a change of state of processor 140, such as entering a reduced power state, while at the same time allowing for software intervention. In the various embodiments of the present invention, software intervention may save a portion or all of the pertinent state information within processor 140 prior to entering a reduced power state. State machine 142, and the various embodiments thereof, is described in more detail below with reference to FIGS. 3 and 4. Register 144, and the various embodiments thereof, is described in more detail below with reference to FIG. 2.

Processor 140 is shown in FIG. 1 receiving power fault indications from PMIC 130. In some embodiments, processor 140 receives power fault indications from sources other than PMIC 130. For example, another circuit coupled to sense the state of the batteries or any other power source may provide signals to indicate power faults. The various embodiments of the present invention are not limited to by the interconnect between a PMIC and a processor as shown in FIG. 1.

Memory 150 represents an article that includes a machine readable medium. For example, memory 150 represents any one or more of the following: a hard disk, a floppy disk, random access memory (RAM), read only memory (ROM), FLASH memory, CDROM, or any other type of article that includes a medium readable by processor 140. Memory 150 can store instructions for performing the execution of the various method embodiments of the present invention.

In operation, processor 140 reads instructions and data from memory 150 and performs actions in response thereto. For example, processor 140 may read from, or write to, register 144 in response to instructions read from memory 150. Also for example, processor 140 may access instructions from memory 140 when a power fault indication is received and software intervention is allowed. Further, in some embodiments, processor 140 may access instructions from memory 140 when waking up from a reduced power state, and when determining whether the reduced power state was entered as a result of a received power fault indication.

Although processor 140 and memory 150 are shown separate in FIG. 1, embodiments exist that combine the circuitry of processor 140 and memory 150 in a single integrated circuit. For example, memory 150 may be an internal memory within processor 140 or may be a microprogram control store within processor 140.

Figure 2:
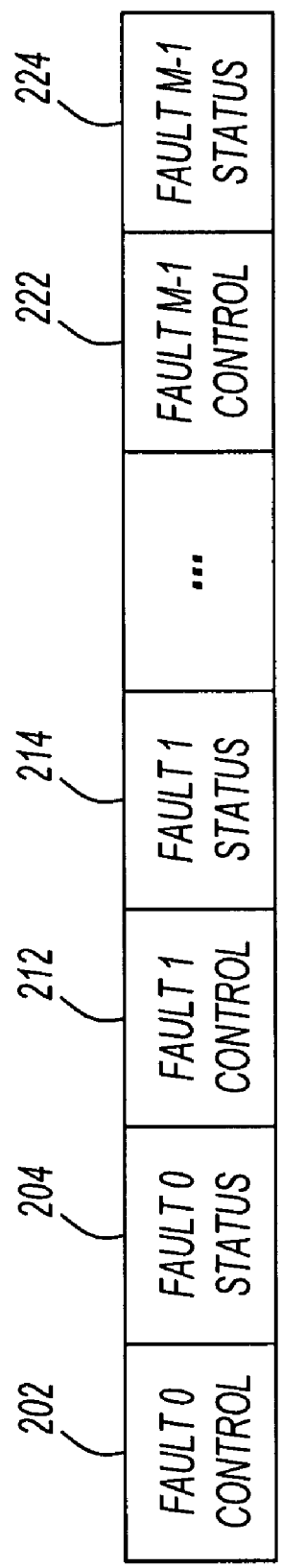
FIG. 2 shows a register.

FIG. 2 shows a register in accordance with various embodiments of the present invention. Register 144 is shown in FIG. 2 including fault control bits 202, 212, and 222, and fault status bits 204, 214, and 224. As shown in FIG. 2, register 144 includes a fault control bit and a fault status bit for each potential fault indication. For example, fault control bit 202 and fault status bit 204 correspond to a first potential power fault indication (fault 0), fault control bit 212 and fault status bit 214 correspond to a second potential power fault indication (fault 1), and fault control bit 222 and fault status bit 224 correspond to an $M^{th}$ potential power fault indication (fault M−1).

Register 144 is shown in FIG. 2 having control and status bits for each of the M potential power faults shown in FIG. 1. The control bit for each power fault in register 144 provides an indication to a state machine to take various actions based on the identity of a received power fault indication and the status of the control bit. For example, state machine 142 (FIG. 1) may perform a different action when power fault zero is received and fault zero control bit 202 is a zero versus when power fault zero control bit 202 is a one.

In some embodiments fault control bits in register 144 determine whether processor 140 (FIG. 1) allows software intervention when a power fault indication is received. For example, when power fault zero is received and fault zero control bit 202 is a zero, state machine 142 may cause the processor to enter a reduced power state without allowing software intervention. By not allowing software intervention, the processor may enter a reduced power state quickly, however, the current state of the processor may only be partially saved or may not be saved at all. Also for example, if power fault zero is received and power fault zero control bit 202 is a one, state machine 142 may alert a processor core within processor 140 that it is to enter a reduced power state, and then allow software intervention. By allowing software intervention, processor 140 may allow an orderly shutdown by ending any processes running on processor 140, and by saving any processor state information.

In some embodiments, when a power fault indication is received and the state machine reads the fault control bit and takes appropriate action, the corresponding fault status bit is set. By setting the corresponding fault status bit the processor may determine whether a reduced power state was entered because of a received power fault indication. For example, when a processor runs an initialization routine upon waking up from a reduced power state, the initialization routine may check the value of one or more fault status bits in register 144, and take appropriate action. The appropriate action may include retrieving saved state information that was stored when a state machine allowed software intervention as a result of a power fault indication.

In some embodiments, a status bit in register 144 is set whenever a power fault indication is received. In other embodiments, a status bit is only set when the power fault indication is received and the corresponding fault control bit is in a particular state. For example, in some embodiments fault zero status bit 204 is set only when a fault zero indication is received and fault zero control bit 202 is set to a zero.

Register 144 is shown with control bits and status bits for each of M potential power fault indications. In some embodiments, M may be equal to two, in which case register 144 includes bits 202, 204, 212, and 214. In these embodiments, two power fault indications may be received by a processor, and the control bits and the status bits for the two fault indications are included in register 144. In general, M may be any number, and register 144 may include any number of control bits and status bits.

Figure 3:
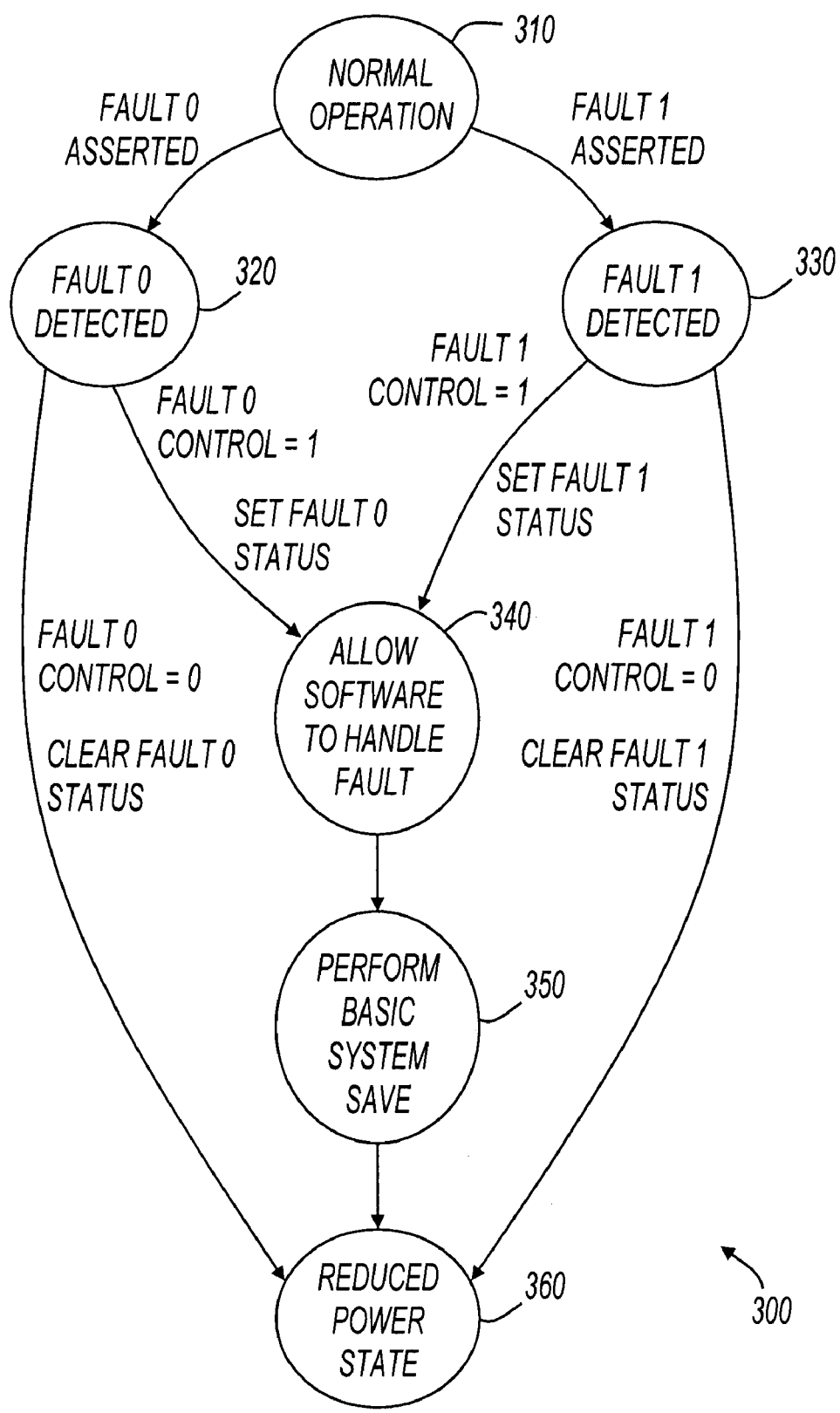
FIGS. 3 and 4 show state machine diagrams.

FIG. 3 shows a state diagram for a power fault handling state machine. State machine 300 corresponds to embodiments of state machine 142 (FIG. 1) in which M equals two. With M equal to two, the power fault indications include power fault zero and power fault one. State machine 300 begins in normal operation 310 and leaves normal operation 310 when either power fault zero is asserted or power fault one is asserted.

If power fault zero is asserted, state machine 300 enters state 320 which indicates fault zero has been detected. State machine 300 leaves state 320 in different directions based on the value of the corresponding control bit in the register. For example, if power fault zero control bit is set to zero, then state machine 300 causes the processor to directly enter a reduced power state at 360. Also for example, if the fault zero control bit is equal to one, then state machine 300 transitions to state 340 and allows software to handle the power fault. A basic system save is performed in either hardware or software at 350, and a reduced power state is entered at 360.

As shown in FIG. 3, state machine 300 sets the corresponding status bit when software intervention is allowed, and clears the corresponding status bit when software intervention is not allowed. In some embodiments, the status bit is set when software intervention is not allowed and the status bit is cleared when software intervention is allowed. In still further embodiments, the status bit is set when the power fault is asserted, and remains set regardless of the path taken to the reduced power state at 360.

The right side of FIG. 3 shows the operation of state machine 300 when power fault one is asserted. As shown in FIG. 3, similar action is taken for fault one as for fault zero, but the ability to allow software intervention or to enter a reduced power state without software intervention may be provided separately for each of fault zero and fault one. This behavior is provided in part by separate control bits in register 144 (FIGS. 1, 2) for each of the power fault indications received by the state machine.

Figure 4:
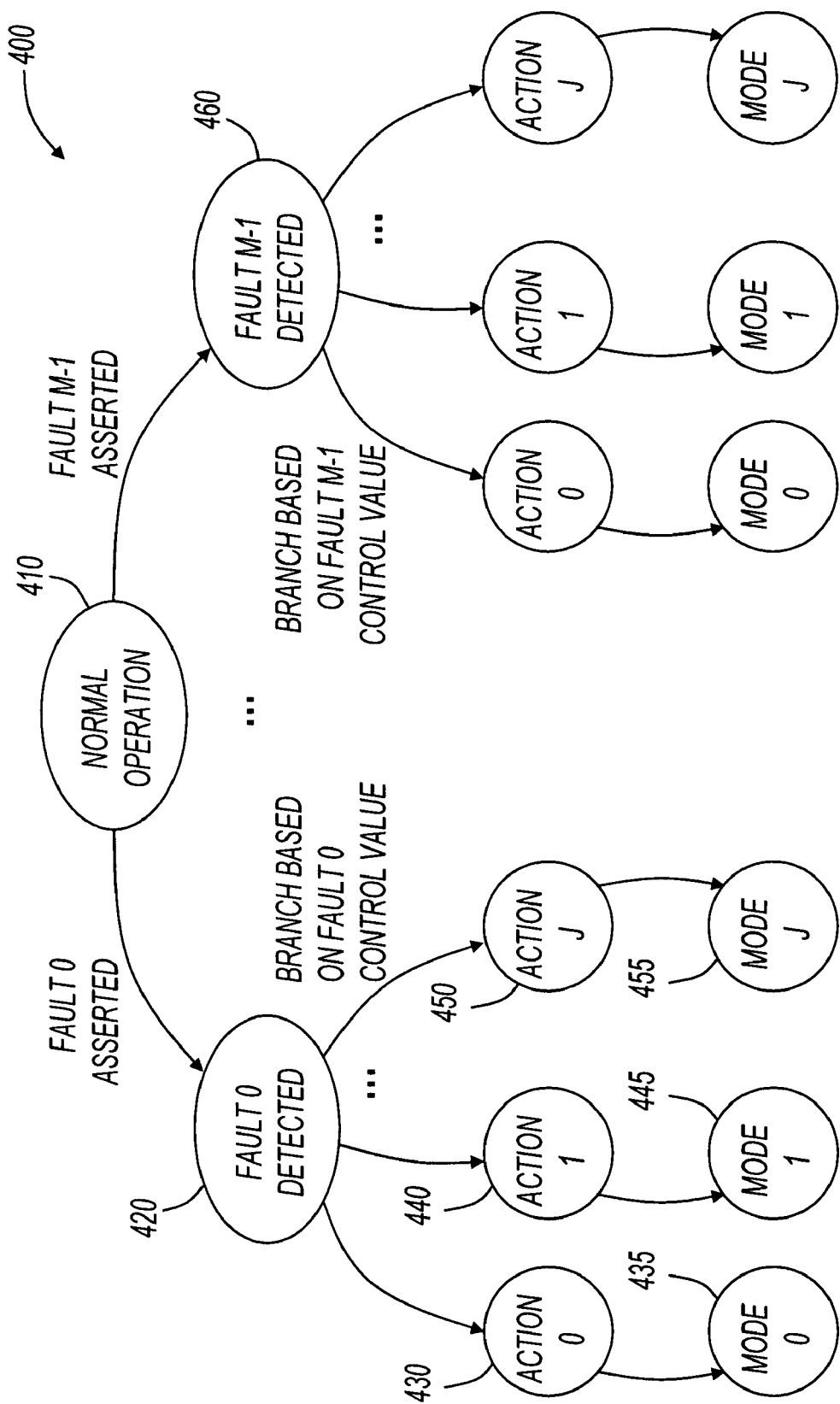

FIG. 4 shows a state machine diagram in accordance with various embodiments of the present invention. State machine 400 represents various embodiments of the operation of state machine 142 (FIG. 1). In general, state machine 400 represents a state machine that receives any of M possible power fault indications, and may take a plurality of different actions based on the identity of the power fault indication and also based on a control value in a register. For example, state machine 400 begins in normal operation 410 and transitions out based on the identity of a received power fault indication.

If fault zero is asserted, state machine 400 transitions to 420 to indicate fault zero has been detected. Also, if fault M−1 is asserted, state machine 400 transitions to 460 to indicate fault M−1 has been detected. M may be any number, and in these embodiments, M states corresponding to state 420 and 460 may exist corresponding to the detection of any one of the M power fault indications.

Once a power fault is detected, any number of actions may take place based on the identity of the power fault indication and on a value in a register. For example, from state 420 where power fault zero is detected, action zero, action one, . . . , or action J may be taken based on a control value corresponding to fault zero. In some embodiments, the control value that determines the branch direction out of state 420 is included in a register such as register 144 (FIG. 1). In these embodiments, the fault zero control value includes multiple bits, as opposed to the single fault zero control bit 202 shown in FIG. 2. For example, when a control value has a value of zero, state machine 400 may transition from state 420 to state 430 where action zero is taken, and then state machine 400 may enter state 435 in which the processor enters mode zero. Similar action is taken by state machine 400 if the control value is a one, in which case state machine 400 traverses states 440 and 445, or if the control value has a value of J, in which case state machine 400 traverses states 450 and 455.

Each of the actions zero through J may either allow software intervention, or not allow software intervention. Further, each of actions zero through J may provide varying amounts of saved state information regardless of whether software intervention is allowed. For example, one action may save information deemed most critical and then transfer to the corresponding mode state, while another action may save critical state information as well as further state information deemed not as critical. As shown in FIG. 4, this may be performed based on the identity of the power fault indication received. For example, if a main battery fault is received that indicates a complete loss of power, an action corresponding to minimal operations within the processor prior to entering a reduced power state may be suitable. Further, any of actions zero through J may correspond to no action at all. For example, action one at 440 may perform no action prior to transitioning to mode one at 445.

Each of modes zero through J may correspond to reduced power states or any other type of state. For example, a mode may correspond to normal operation, in which case state machine 400 transitions back to state 410. In other embodiments, a mode may correspond to a power off state, and in still further embodiments a mode may correspond to state in which portions of an electronic system are powered off and other portions remain powered on. In some embodiments, one or modes are identical. As shown in FIG. 4, state machine 400 may support any number of power fault indications to be received by a processor, and for each possible received power fault indication, state machine 400 may also support any number of actions and any number of modes.

Figure 5:
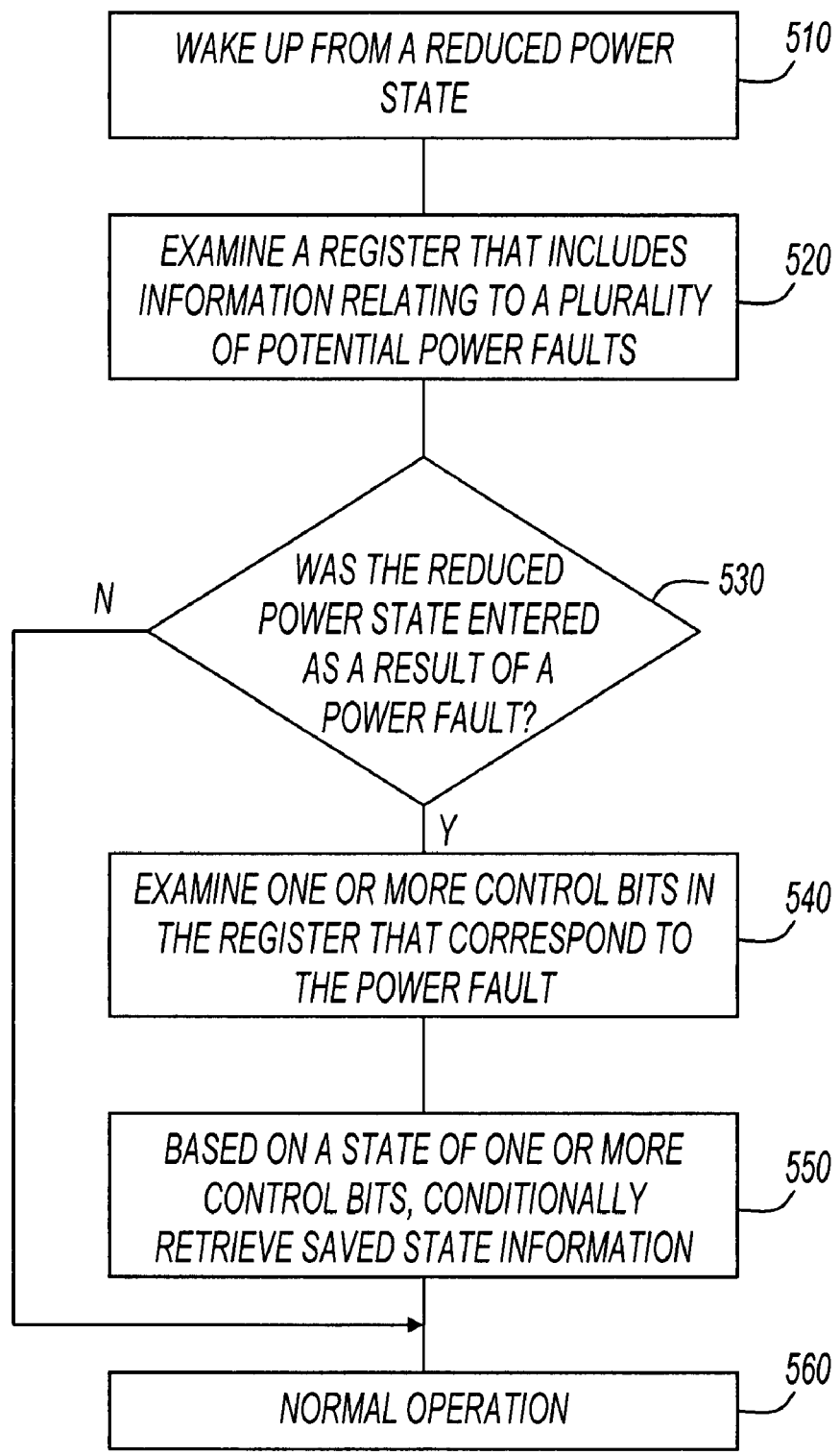
FIG. 5 shows a flowchart in accordance with various embodiments of the present invention.

FIG. 5 shows a flowchart in accordance with various embodiments of the present invention. In some embodiments, method 500, or portions thereof, is performed by a processor or an electronic system, embodiments of which are described with reference to the various figures. In some embodiments, method 500 is performed by a processor during an initialization process. The initialization process may be performed when recovering from a reduced power state, or when power is applied. Method 500 is not limited by the particular type of apparatus or software element performing the method. The various actions in method 500 may be performed in the order presented, or may be performed in a different order. Further, in some embodiments, some actions listed in FIG. 5 are omitted from method 500.

Figure 6:
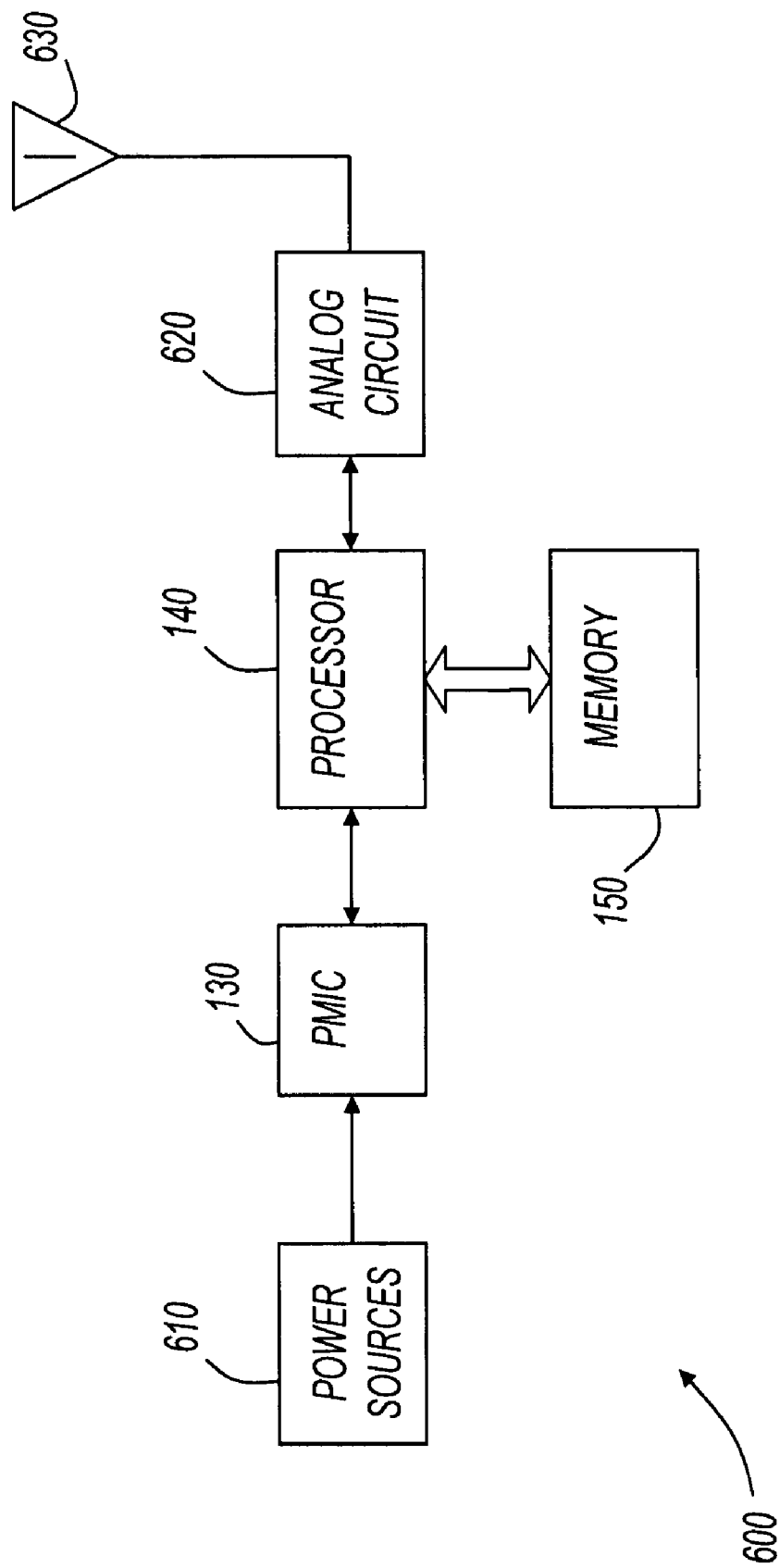
FIG. 6 shows an electronic system in accordance with various embodiments of the present invention.

Method 500 begins at 510 where a processor or system wakes up from a reduced power state. In some embodiments, the system that wakes up may correspond to an electronic system such as system 100 (FIG. 1) or system 600 (FIG. 6, described below). At 520, a register that includes information relating to a plurality of potential power faults is examined by the processor or system waking up at 510. In some embodiments, the register corresponds to register 144 (FIGS. 1, 2). The information included in the register may include status bits for each of the plurality of potential power faults. For example, referring now back to FIG. 2, fault status bits 204, 214, and 224 are examples of status bits that may be included in a register that is examined at 520.

At 530, the system or processor waking up determines whether the reduced power state was entered as a result of a power fault. In some embodiments, the status bits in the register examined at 520 may indicate whether the reduced power state was entered as a result of a power fault. Further, the status bits may indicate which of the plurality of potential power faults caused the processor or system to enter the reduced power state. If the reduced power state was entered as a result of a power fault, method 500 continues at 540 to examine one or more control bits in the register that correspond to the power fault. In some embodiments, this may correspond to examining control bits such as fault control bits 202, 212, and 222 in register 144 (FIG. 2).

After the acts shown at 540, the apparatus performing method 500 has access to information describing which of the plurality of potential power faults caused a previous transition to a reduced power state, and also has access to information describing what actions were taken prior to entering the reduced power state. For example, referring now back to FIGS. 3 and 4, an apparatus performing method 500 may trace the operation of either state machine 300 or state machine 400 from a previous transition to a reduced power state.

At 550, based on a state of one or more control bits, the apparatus performing method 500 conditionally retrieves saved state information. In some embodiments, the amount of saved state information to retrieve may be determined by the state of the one or more control bits. Referring now back to 530, if the reduced power state was not entered as a result of a power fault, method 500 continues at 560 and begins normal operation without retrieving saved state information.

FIG. 6 shows a system diagram in accordance with various embodiments of the present invention. Electronic system 600 includes processor 140, memory 150, power mode integrated circuit (PMIC) 130, power sources 610, analog circuit 620, and antenna 630. Processor 140, memory 150, and PMIC 130 are described above with reference to FIG. 1. Power sources 610 may include any type of power sources, including batteries, power supplies, charging circuits, or the like. In some embodiments, power sources 610 includes main battery 120 and backup battery 110 (FIG. 1).

Example systems represented by FIG. 6 include cellular phones, personal digital assistants, wireless local area network interfaces, or any other system that include a processor and an antenna. Many other system uses exist for processor 140, PMIC 130, and the various power fault mechanisms herein described. For example, processor 140 may be used in a desktop computer, a network bridge or router, or any other system without an antenna.

Analog circuit 620 communicates with antenna 630 and processor 140. In some embodiments, analog circuit 620 includes a physical interface (PHY) corresponding to a communications protocol. For example, analog circuit 620 may include modulators, demodulators, mixers, frequency synthesizers, low noise amplifiers, power amplifiers, and the like. In some embodiments, analog circuit 620 may include a heterodyne receiver, and in other embodiments, analog circuit 620 may include a direct conversion receiver. In some embodiments, analog circuit 620 may include multiple receivers. For example, in embodiments with multiple antennas 630, each antenna may be coupled to a corresponding receiver. In operation, analog circuit 620 receives communications signals from antenna 630, and provides signals to processor 140. Further, processor 140 may provide signals to analog circuit 620, which operates on the signals and then transmits them to antenna 630.

In some embodiments, processor 140 includes circuitry or performs methods to implement error detection/correction, interleaving, coding/decoding, or the like. Also in some embodiments, processor 140 may implement all or a portion of a media access control (MAC) layer of a communications protocol. In some embodiments, a MAC layer implementation may be distributed between processor 140 and digital circuitry (not shown) external to processor 140.

Analog circuit 620 may be adapted to receive and demodulate signals of various formats and at various frequencies. For example, analog circuit 620 may be adapted to receive time domain multiple access (TDMA) signals, code domain multiple access (CDMA) signals, global system for mobile communications (GSM) signals, orthogonal frequency division multiplexing (OFDM) signals, multiple-input-multiple-output (MIMO) signals, spatial-division multiple access (SDMA) signals, or any other type of communications signals. The present invention is not limited in this regard.

Antenna 630 may include one or more antennas. For example, antenna 630 may include a single directional antenna or an omni-directional antenna. As used herein, the term omni-directional antenna refers to any antenna having a substantially uniform pattern in at least one plane. For example, in some embodiments, antenna 630 may include a single omni-directional antenna such as a dipole antenna or a quarter wave antenna. Also for example, in some embodiments, antenna 630 may include a single directional antenna such as a parabolic dish antenna or a Yagi antenna. In still further embodiments, antenna 630 may include multiple physical antennas. For example, in some embodiments, multiple antennas are utilized to support multiple-input-multiple-output (MIMO) processing or spatial-division multiple access (SDMA) processing.

Although the various elements of system 600 are shown separate in FIG. 6, embodiments exist that combine the circuitry of processor 140, memory 150, PMIC 130 and analog circuit 620 in a single integrated circuit. In some embodiments, the various elements of system 600 may be separately packaged and mounted on a common circuit board. In other embodiments, the various elements are separate integrated circuit dice packaged together, such as in a multi-chip module, and in still further embodiments, various elements are on the same integrated circuit die.

Processors, state machines, registers, and other embodiments of the present invention can be implemented in many ways. In some embodiments, they are implemented in integrated circuits. In some embodiments, design descriptions of the various embodiments of the present invention are included in libraries that enable designers to include them in custom or semi-custom designs. For example, any of the disclosed embodiments can be implemented in a synthesizable hardware design language, such as VHDL or Verilog, and distributed to designers for inclusion in standard cell designs, gate arrays, or the like. Likewise, any embodiment of the present invention can also be represented as a hard macro targeted to a specific manufacturing process. For example, register 144 may be represented as polygons assigned to layers of an integrated circuit.

Although the present invention has been described in conjunction with certain embodiments, it is to be understood that modifications and variations may be resorted to without departing from the spirit and scope of the invention as those skilled in the art readily understand. Such modifications and variations are considered to be within the scope of the invention and the appended claims.

What is claimed is:

1. A method comprising:
   receiving one of a plurality of power fault indications;
   accessing a control register programmed to separately specify for each of the plurality of power fault indications whether software intervention is to be allowed, wherein the control register includes more than one control bit for each of the plurality of power fault indications; and
   conditionally allowing software intervention and entering a reduced power state based on contents of the control register and the identity of the power fault indication.

2. The method of claim 1 wherein conditionally allowing software intervention and entering a reduced power state comprises entering a reduced power state without allowing software intervention.

3. The method of claim 1 wherein conditionally allowing software intervention and entering a reduced power state comprises alerting a processor core of the power fault indication and allowing software intervention.

4. The method of claim 1 wherein receiving one of a plurality of power fault indications comprises receiving a main power supply fault indication or a backup power supply fault indication.

5. A method comprising:
waking up from a reduced power state;
examining a register that specifies which of a plurality of power faults caused the reduced power state and whether for each of the plurality of power faults software intervention was allowed when entering the reduced power state;
if the reduced power state was entered as a result of a power fault that allowed software intervention, retrieving saved state information and entering a non-reduced power state; and
if the reduced power state was entered as a result of a power fault that did not allow software intervention, entering the non-reduced power state without retrieving saved state information.

6. The method of claim 5 wherein examining a register comprises examining a register that includes a plurality of status bits, wherein each of the plurality of status bits corresponds to one of the plurality of power faults.

7. An article comprising:
a machine-readable medium having instructions stored thereon that when accessed result in a machine performing:
waking up from a reduced power state;
examining a register that specifies which of a plurality of power faults caused the reduced power state and whether for each of the plurality of power faults software intervention was allowed when entering the reduced power state;
if the reduced power state was entered as a result of a power fault that allowed software intervention, retrieving saved state information and entering a non-reduced power state; and
if the reduced power state was entered as a result of a power fault that did not allow software intervention, entering the non-reduced power state without retrieving saved state information.

8. The article of claim 7 wherein examining a register comprises examining a register that includes a plurality of status bits, wherein each of the plurality of status bits corresponds to one of the plurality of power faults.

9. A processor comprising:
a register to hold a separate control bit for each of a plurality of potential power faults, wherein each of the separate control bits specify whether software intervention is to be allowed when a corresponding power fault occurs; and
a state machine coupled to the register to receive power fault signals corresponding to the plurality of potential power faults, and to perform an operation when a power fault is received, wherein the operation includes allowing software intervention when specified by the control bit for the received power fault, and the operation further includes causing the processor to enter a reduced power state without allowing software intervention when specified by the control bit for the received power fault;
wherein the register includes multiple control bits for each of the plurality of potential power faults.

10. A processor comprising:
a register to hold a separate control bit for each of a plurality of potential power faults, wherein each of the separate control bits specify whether software intervention is to be allowed when a corresponding power fault occurs; and
a state machine coupled to the register to receive power fault signals corresponding to the plurality of potential power faults, and to perform an operation when a power fault is received, wherein the operation includes allowing software intervention when specified by the control bit for the received power fault, and the operation further includes causing the processor to enter a reduced power state without allowing software intervention when specified by the control bit for the received power fault;
wherein the register includes one control bit for each of two potential power faults.

11. The processor of claim 10 wherein the register further includes one status bit for each of the two potential power faults.

* * * * *